United States Patent [19]
Franklin et al.

[11] 4,253,263
[45] Mar. 3, 1981

[54] FISHING LURE

[76] Inventors: Robert L. Franklin, 15 Silverwood Cir., Annapolis, Md. 21403; Robert S. Steiner, P.O. Box 134, Annapolis, Md. 21404

[21] Appl. No.: 34,074
[22] Filed: Apr. 27, 1979
[51] Int. Cl.³ .............................................. A01K 85/00
[52] U.S. Cl. ................................. 43/42.24; 43/42.32; 43/42.36
[58] Field of Search ................. 43/42.06, 42.24, 42.32, 43/42.35, 42.36

[56] References Cited

U.S. PATENT DOCUMENTS

| | | | |
|---|---|---|---|
| 2,475,101 | 7/1949 | Kosash | 43/42.36 |
| 2,834,141 | 5/1958 | Quyle | 43/42.32 X |
| 3,680,249 | 8/1972 | Chiarenza | 43/43.13 X |
| 3,965,606 | 6/1976 | Bingler | 43/43.13 |

FOREIGN PATENT DOCUMENTS

| | | | |
|---|---|---|---|
| 86972 | 12/1955 | Norway | 43/42.36 |
| 94124 | 2/1959 | Norway | 43/42.24 |
| 117888 | 6/1969 | Norway | 43/42.24 |

Primary Examiner—Nicholas P. Godici
Attorney, Agent, or Firm—Schwartz, Jeffery, Schwaab, Mack, Blumenthal & Koch

[57] ABSTRACT

A surgical eel fishing lure includes a flexible rubbery polymer tube member having an outer surface of one color and an inner surface of another color. A fish hook extends from one end, and a swivel is located at the other end thereof. A stainless steel forming wire joins the hook and swivel, and the tube is bent back on itself enclosing the swivel therein and presenting a rounded "head" on the "eel" for providing uniform water flow over the head and reduced resistance.

6 Claims, 2 Drawing Figures

FISHING LURE

BACKGROUND OF THE INVENTION

The invention is directed toward a fishing lure, primarily used for trolling, and normally referred to as a surgical eel.

Prior art surgical eel lures have had deficiencies in that they came apart easily and lost their shape.

Further, the prior art surgical eel lures did not have the appearance of an eel as they were pulled through the water.

Because of the material from which the prior art lures are made, they often rust, particularly in salt or brackish water.

SUMMARY AND OBJECTS OF THE INVENTION

It is an object of the instant invention to provide a fishing lure made of surgical tubing which has the appearance of an eel as it is pulled through the water.

Another object is to provide a lure which will hold its shape, will not rust, and will not easily come apart.

Still another object is to provide a lure which will have uniform water flow over the head of the "eel", thus reducing resistance as the lure is pulled through the water.

A surgical eel fishing lure includes a flexible rubbery polymer tube member having an outer surface of one color and an inner surface of another color. A fish hook extends from one end, and a swivel is located at the other end thereof. A stainless steel forming wire joins the hook and swivel, and the tube is bent back on itself enclosing the swivel therein and presenting a rounded "head" on the "eel" for providing uniform water flow over the head and reduced resistance.

BRIEF DESCRIPTION OF THE DRAWINGS

The above and other objects of the invention will become apparent from the following description, taken with the accompanying drawings wherein.

DETAILED DESCRIPTION OF THE DRAWINGS

Figure 1:
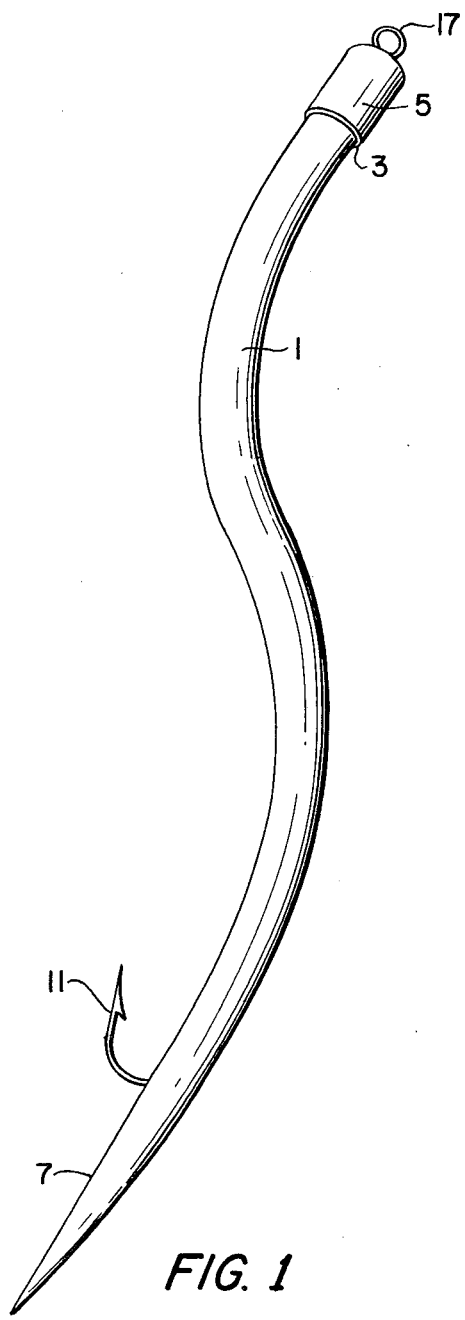
FIG. 1 is a side elevation view of a lure according to the instant invention.
Figure 2:
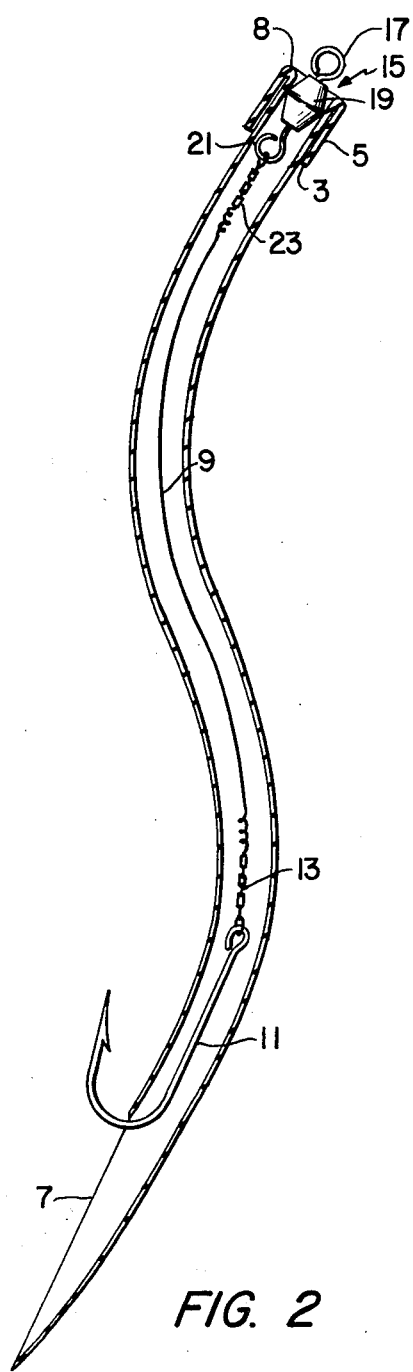
FIG. 2 is a cross-sectional view of the lure of FIG. 1.

A length of surgical tubing 1 of approximately 13 inches in length is cut transversely and forming an end 3. The tube is preferably formed of a material or synthetic rubbery polymer. The end portion 3 is bent back at 5 over itself and adhesively secured. The opposite end of the tubing 1 is cut on an oblique or beveled angle at 7. The tubing may have an outside surface of one color, for example, white, and an inside coloring such as yellow or beige. Thus, the portion 5 has a contrasting color to the portion seen at 1. More importantly, a rounded end 8 reduces resistance as the lure is pulled through the water.

A stainless steel forming wire 9 of, for example, 0.026 gauge, 140 pound test, is inserted into the surgical tubing with a hook 11 attached by four haywire twists and three overhand twists at 13. At the end opposite the hook and inserted at the double back portion 5 is a swivel 15, preferably of nickel plated brass. The swivel has a first loop portion 17 rotatably mounted in the conventional manner in a conventional swivel body 19. Thus loop 17 is used for attachment to the leader or fishing line.

A second loop 21 is also rotatably mounted in member 19. Secured to loop 21 by four haywire twists and three overhand twists at 23 is the wire 9.

In the embodiment shown in the drawing, the tubing is made of 7/16 inch gum latex having a wall thickness of 1/16 inch.

Because of the stretchability of the latex chosen, and particularly the fact that the wire 9 is made of forming wire, the surgical eel lure will always return to its preformed shape, even when stretched by a large fish or by a person manipulating the lure.

While one embodiment of the invention has been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

We claim:

1. A fishing lure comprising:
   (a) a flexible tube member having a pair of ends,
   (b) a fish hook extending from one end of the tube member and a swivel member extending at the other end,
   (c) a forming wire which returns to its preformed curved shape in the tube joining the hook and the swivel member,
   (d) the end of the tube member having the swivel member therein bent back on itself forming a rounded end thereat, said tube having an outer surface of one color and an inner surface of another color whereby the bent back portion of the tube has a contrasting color relative to the remainder of the outer surface of the lure.

2. A fishing lure as defined in claim 1 wherein the tube member is of a rubbery polymeric material.

3. A fishing lure as defined in claim 1 wherein the wire is joined to the hook and to the swivel member by means of a plurality of haywire twists and overhand twists.

4. A fishing lure as defined in claim 1 wherein the end of the tube bent back on itself extends about one quarter inch.

5. A fishing lure as defined in claim 1 wherein the wire is about 0.026 gauge, 140 pound test stainless steel.

6. A fishing lure as defined in claim 1 wherein the bent back portion is adhesively secured to the outer surface of the tube member.

* * * * *